(12) United States Patent
Lu (10) Patent No.: US 9,884,261 B2
(45) Date of Patent: *Feb. 6, 2018

(54) METHOD OF MANUFACTURING A SWORD OR SPARRING INSTRUMENT

(71) Applicant: Neptune Trading Inc., Ontario, CA (US)

(72) Inventor: Margaret Lu, Edmond, OK (US)

(73) Assignee: Neptune Trading Inc., Ontario, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/261,426

(22) Filed: Sep. 9, 2016

(65) Prior Publication Data

US 2016/0375369 A1 Dec. 29, 2016

Related U.S. Application Data

(63) Continuation of application No. 14/937,595, filed on Nov. 10, 2015, now Pat. No. 9,463,395, which is a continuation of application No. 14/088,327, filed on Nov. 22, 2013, now Pat. No. 9,211,480.

(51) Int. Cl.
| | |
|---|---|
| *B29C 70/70* | (2006.01) |
| *A63H 33/00* | (2006.01) |
| *B29C 39/02* | (2006.01) |
| *B29K 75/00* | (2006.01) |
| *B29L 31/52* | (2006.01) |

(52) U.S. Cl.
CPC ......... *A63H 33/009* (2013.01); *B29C 39/026* (2013.01); *B29C 70/70* (2013.01); *B29K 2075/00* (2013.01); *B29L 2031/52* (2013.01)

(58) Field of Classification Search
CPC ....... A63B 33/00; A63B 33/009; A63B 69/00; A63B 69/02; A63B 69/004; B26C 66/71; B26C 44/0461; B26C 44/3415; B26C 45/1671; B26C 70/68; B26K 2075/00
USPC ...... 446/473, 486; 264/45.1, 45.2, 243, 261, 264/310
See application file for complete search history.

(56) References Cited

U.S. PATENT DOCUMENTS

| | | | |
|---|---|---|---|
| 4,891,081 A | 1/1990 | Takahashi et al. | |
| 4,956,141 A | 9/1990 | Allen et al. | |
| 5,256,099 A * | 10/1993 | Rudell | A63H 33/009 401/148 |
| 5,389,033 A | 2/1995 | Rauch | |

(Continued)

OTHER PUBLICATIONS

U.S. Appl. No. 14/937,595, filed Nov. 10, 2015.
U.S. Appl. No. 14/088,327, filed Nov. 22, 2013.

*Primary Examiner* — Kien Nguyen
(74) *Attorney, Agent, or Firm* — Levine Bagade Han LLP (57) ABSTRACT

Disclosed are methods of making polymeric swords and sparring instruments having improved mechanical properties. In one embodiment, a method of making a polymeric sword includes centering a flexible support member on either a first half of a sword mold or on a second half of the sword mold; pouring a polymer mixture into the first half the sword mold and into the second half of the sword mold and closing the sword mold by clasping the first half of the sword mold to the second half of the sword mold; heating the sword mold comprising the polymer mixture in a heating apparatus; and removing the polymeric sword from the sword mold.

20 Claims, 10 Drawing Sheets

(56) References Cited

U.S. PATENT DOCUMENTS

| | | |
|---|---|---|
| 5,542,667 A | 8/1996 | Lezdey et al. |
| 5,630,998 A | 5/1997 | Parsons |
| 5,728,333 A | 3/1998 | Tabata et al. |
| 5,820,438 A | 10/1998 | Horton, III |
| 7,658,664 B2 | 2/2010 | Tong |
| 8,007,342 B2 | 8/2011 | Tong |
| 9,463,395 B2 | 10/2016 | Lu |
| 2004/0127292 A1 | 7/2004 | Chan et al. |
| 2004/0162003 A1 | 8/2004 | Vanaver |
| 2007/0111636 A1 | 5/2007 | Hatherley |
| 2007/0248652 A1 | 10/2007 | Barzilay et al. |
| 2009/0023870 A1 | 1/2009 | Berksoy et al. |
| 2009/0247306 A1 | 10/2009 | Bogner et al. |
| 2015/0147937 A1 | 5/2015 | Lu |
| 2016/0067625 A1 | 3/2016 | Lu |

\* cited by examiner

METHOD OF MANUFACTURING A SWORD OR SPARRING INSTRUMENT

CROSS-REFERENCE TO RELATED APPLICATIONS

This application is a continuation application of U.S. patent application Ser. No. 14/937,595 filed on Nov. 10, 2015, which is a continuation application of U.S. patent application Ser. No. 14/088,327 filed on Nov. 22, 2013, now issued as U.S. Pat. No. 9,211,480, the contents of which are incorporated herein by reference in their entireties.

BACKGROUND

The recent rise in the popularity of the fantasy genre in literary works, television, and films have brought about an attendant rise in the demand for weaponry seen in such works. These types of weaponry are often carried by fans of the genre to gatherings such as renaissance faires (Ren-Faires), comic conventions (ComicCons), or costume play (CosPlay) events. The most popular form of such weaponry involve bladed instruments such as longswords, broadswords, and sabers. Since public venues and events often ban steel or other metallic weaponry for public safety concerns, a popular alternative is to choose swords made of polymeric materials such as polyethylene (PE) or ethylene-vinyl acetate (EVA). However such swords often lack the look and feel of their authentic counterparts and are prone to tears, bends, or breaks.

Moreover, enthusiasts of combat sports such as fencing, wushu, and kendo are frequently in need of practice instruments that can mimic the weight and durability of real swords. While polymeric swords offer a safer surrogate to metallic instruments, most polymeric swords sold in the market today bend or break upon repeated impact. In addition, wielding such polymeric swords often leaves much to be desired as the weight of these swords tend to belie their decorative authenticity. Therefore, there is a need for a polymeric sword that can withstand the rigors of actual sword play but still offer the look and feel of a metallic arm.

SUMMARY

Disclosed are polymeric swords and sparring instruments having improved mechanical properties and methods of making such swords and sparring instruments. In one aspect, a polyurethane sword comprises a handle portion and a blade portion. In this aspect, the polyurethane sword also comprises a flexible support member having a handle support portion and a blade support portion. In this aspect, the polyurethane sword also comprises a polyurethane outer layer configured to encase the flexible support member from the handle support portion to the blade support portion. In this aspect, the handle portion comprises the handle support portion and the polyurethane outer layer encasing the handle support portion. Moreover, the blade portion comprises the blade support portion and the polyurethane outer layer encasing the blade support portion. In addition, the polyurethane outer layer may be composed of a machine perfused polyurethane mixture.

In this aspect, the flexible support member may comprise a substantially cylindrical hollow core extending from the handle support portion to the blade support portion. In this aspect, the diameter of the substantially cylindrical hollow core may range from 0.5 mm to 1.5 mm. Moreover, the polyurethane outer layer may expose a first aperture of the substantially cylindrical hollow core at a first end of the flexible support member and expose a second aperture of the substantially cylindrical hollow core at a second end of the flexible support member. In this aspect, the flexible support member may be composed of a polyester resin and fiberglass. Furthermore, the machine perfused polyurethane mixture may comprise 67% polyurethane polymers and 33% methylene diphenyl diisocyanate (MDI).

In another aspect, a method of making a polyurethane sword is disclosed comprising the steps of: centering a flexible support member on either a first half of a sword mold or on a second half of the sword mold; spraying a base coat paint on either the first half of the sword mold or on the second half of the sword mold; pouring a machine perfused polyurethane mixture in both halves of the sword mold and closing the mold; heating the sword mold, and removing the polyurethane sword from the sword mold.

In this aspect, the method may further comprise the step of spraying a wax-based release agent on the first half of the sword mold and on the second half of the sword mold before centering the flexible support member. In addition, the method may further comprise the step of rotating the sword mold before heating the sword mold. Moreover, the method may further comprise the step of hanging the sword mold from one end for a period of time at room temperature after heating the sword mold. Finally, the method may further comprise the step of deburring the polyurethane sword after removal from the sword mold. In this aspect, the step of heating the sword mold may comprise heading the sword mold at 45-55 degrees Celsius for a period of 10-15 minutes.

In yet another aspect, a sparring instrument is disclosed comprising a handle portion and a distal portion. In this aspect, the sparring instrument also comprises a support member having a handle support portion and a distal support portion. In this aspect, a polyurethane outer layer is configured to encase the support member from the handle support portion to the distal support portion. In this aspect, the handle portion of the sparring instrument comprises the handle support portion and the polyurethane outer layer encasing the handle support portion of the support member. In addition, the distal portion of the sparring instrument comprises the distal support portion and the polyurethane outer layer encasing the distal support portion of the support member. Furthermore, the polyurethane outer layer may be composed of a machine perfused polyurethane mixture.

The methods and apparatus disclosed herein may be implemented in any means for achieving the various aspects. Other features will be apparent from the accompanying drawings and from the detailed description that follows.

BRIEF DESCRIPTION OF THE DRAWINGS

Example embodiments are illustrated by way of example and are not limited to the figures of the accompanying drawings, in which, like references indicate similar elements.

Other features of the present embodiments will be apparent from the accompanying drawings and from the detailed description that follows.

DETAILED DESCRIPTION

Disclosed are swords and sparring instruments having improved mechanical properties and methods of making such swords and sparring instruments. Although the present embodiments have been described with reference to specific example embodiments, it will be evident that various modifications and changes may be made to these embodiments without departing from the broader spirit and scope of the various embodiments. Moreover, the components shown in the figures, their connections, couples, and relationships, and their functions, are meant to be exemplary only, and are not meant to limit the embodiments described herein.

Figure 1:
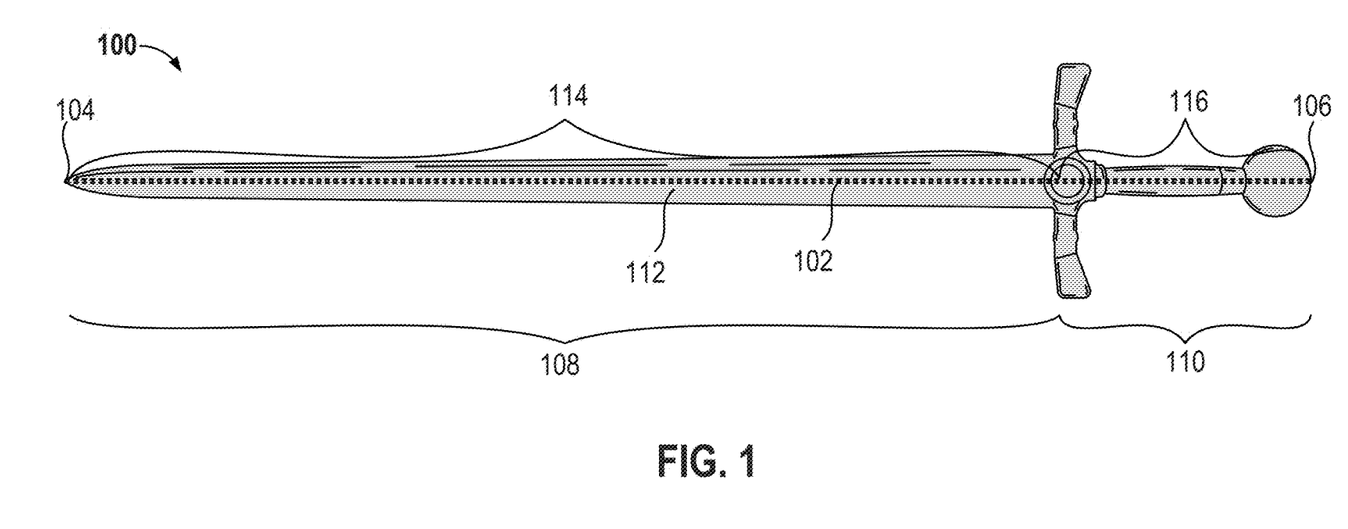
FIG. 1 illustrates an exemplary polyurethane sword, according to one or more embodiments.

Reference is now made to FIG. 1 which illustrates an exemplary polyurethane sword 100. In the embodiment shown in FIG. 1, the polyurethane sword 100 comprises a blade portion 108 and a handle portion 110. In this embodiment, the polyurethane sword 100 also comprises a flexible support member 102 having a blade support portion 114 and a handle support portion 116. In some embodiments, the flexible support member 102 may be composed of a polyester resin and/or fiberglass. In these and other embodiments, the polyester resin may be a thermosetting polyester resin. In other embodiments, the polyester resin may be a vinyl ester resin. In all such embodiments, the flexible support member 102 may be manufactured using an isophthalic procedure.

In one or more embodiments, the flexible support member 102 may comprise a substantially cylindrical hollow core extending from a first end 104 of the flexible support member 102 to a second end 106 of the flexible support member 102. In one embodiment, the first end 104 may be the end of the blade support portion 108 of the flexible support member 102. Moreover, the second end 106 may be the end of the handle support portion 110 of the flexible support member 102. In some embodiments, the diameter of the substantially cylindrical hollow core may range from 0.5 mm to 1.5 mm. In other embodiments, the diameter of the substantially cylindrical hollow core may range from 1.5 mm to 3.0 mm. In additional embodiments, the diameter of the substantially cylindrical hollow core may range from 0.1 mm to 0.4 mm. In all such embodiments, the diameter of the substantially cylindrical hollow core may be sized in proportion to the cross-sectional dimensions of the polyurethane sword 100's sword blade. In some embodiments, the flexible support member 102 may be a rod comprising a solid core.

In one or more embodiments, a polyurethane outer layer 112 may encase the flexible support member 102 from the handle support portion 110 to the blade support portion 108. In some embodiments, the polyurethane outer layer 112 may be substantially shaped or molded as a sword handle when encasing the handle support portion 110 of the flexible support member 102 and substantially shaped as a sword blade when encasing the blade support portion 108 of the flexible support member 102. In this and other embodiments, the handle portion 110 comprises the handle support portion 116 of the flexible support member 102 and the polyurethane outer layer 112 encasing the handle support portion 116. In this and other embodiments, the blade portion 108 comprises the blade support portion 114 of the flexible support member 102 and the polyurethane outer layer 112 encasing the blade support portion 114. In all such embodiments, the polyurethane outer layer 112 may be composed of a machine perfused polyurethane mixture. As will be discussed in the sections that follow, a method of making the polyurethane sword 100 may comprise the machine perfused polyurethane mixture being injected, poured, and/or extruded into a sword mold by a high-pressure pneumatic polyurethane mixing apparatus.

In some embodiments, the polyurethane outer layer 112 may comprise a viscoelastic polyurethane. In other embodiments, the polyurethane outer layer 112 may comprise a low-resistance polyurethane. In these and other embodiments, the polyurethane outer layer 112 may comprise a low-density polyurethane. In one embodiment, the machine perfused polyurethane mixture may comprise a combination of polyurethane polymers and isocyanates. In one preferred embodiment, the isocyanate may be methylene diphenyl diisocyanate (MDI). In this and other embodiments, the machine perfused polyurethane mixture may be composed of 67% polyurethane polymers and 33% methylene diphenyl diisocyanate (MDI). In some embodiments, the polyurethane polymers may comprise any combination of polymeric polyols (e.g., diols and triols). In one or more embodiments, the polymeric polyols used may comprise polyethers or polyesters. In these and other embodiments, the polyethers used may comprise polyethylene glycol, polypropylene glycol, and/or poly(tetramethylene ether) glycol. Alternatively, the polyesters used may comprise polybutadiene. In some embodiments, the machine perfused polyurethane mixture may comprise five (5) parts of water per one hundred (100) parts of polymeric polyols.

In one or more embodiments, the polyurethane outer layer 112 may expose a first aperture 300 (see FIG. 3) of the substantially cylindrical hollow core at the first end 104 of the flexible support member 102. In addition, the polyurethane outer layer 112 may expose a second aperture 200 (see FIG. 2) of the substantially cylindrical hollow core at the second end 106 of the flexible support member 102. One benefit of exposing such apertures is to improve the flexural properties of the flexible support member 102.

Figure 2:
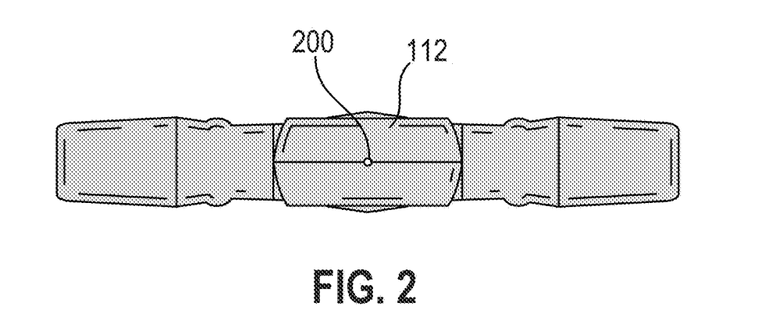
FIG. 2 illustrates a close up view of the handle bottom of the exemplary polyurethane sword of FIG. 1, according to one or more embodiments.

Reference is now made to FIG. 2, which illustrates a close up view of the bottom of the handle of the polyurethane sword 100, according to one or more embodiments. As can be seen in FIG. 2, the polyurethane outer layer 112 may expose the second aperture 200 of the substantially cylindrical hollow core at the second end 106 of the flexible support member 102. In this and other embodiments, the polyurethane outer layer 112 may encase the entire handle support portion 110 of the flexible support member 102. In one embodiment, the polyurethane outer layer 112 may be substantially shaped or molded as a handle when encasing the handle support portion 110 of the flexible support member 102 without an additional support member. In an alternative embodiment, an additional support member may be coupled to the flexible support member 102 at the handle support portion 110. In this and other embodiments, the additional support member may be coupled to the flexible support member 102 in a substantially perpendicular manner. In this alternative embodiment, the polyurethane outer layer 112 may encase both the flexible support member 102 and the additional support member. In one embodiment, the second aperture 200 may be shaped as a substantially circular aperture. In this and other embodiments, the diameter of the second aperture 106 may range from 0.5 mm to 1.5 mm. In alternative embodiments, the diameter of the second aperture 106 may range from 1.5 mm to 3.0 mm. In additional embodiments, the diameter of the second aperture 106 may range from 0.1 mm to 0.4 mm.

Figure 3:
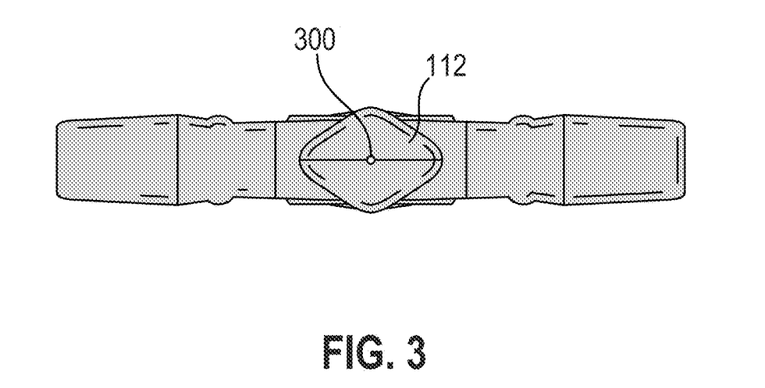
FIG. 3 illustrates a close up view of the blade tip of the exemplary polyurethane sword of FIG. 1, according to one or more embodiments.

Reference is now made to FIG. 3, which illustrates a close up view of the tip of the blade of the polyurethane sword 100, according to one or more embodiments. As can be seen in FIG. 3, the polyurethane outer layer 112 may expose a first aperture 300 of the substantially cylindrical hollow core at the first end 104 of the flexible support member 102. In one or more embodiments, the first aperture 300 and the second aperture 200 may form ends of the substantially cylindrical hollow core of the flexible support member 102. In one embodiment, the first aperture 300 may be shaped as a substantially circular aperture. In this and other embodiments, the diameter of the first aperture 300 may range from 0.5 mm to 1.5 mm. In alternative embodiments, the diameter of the first aperture 300 may range from 1.5 mm to 3.0 mm. In additional embodiments, the diameter of the first aperture 300 may range from 0.1 mm to 0.4 mm.

Figure 4:
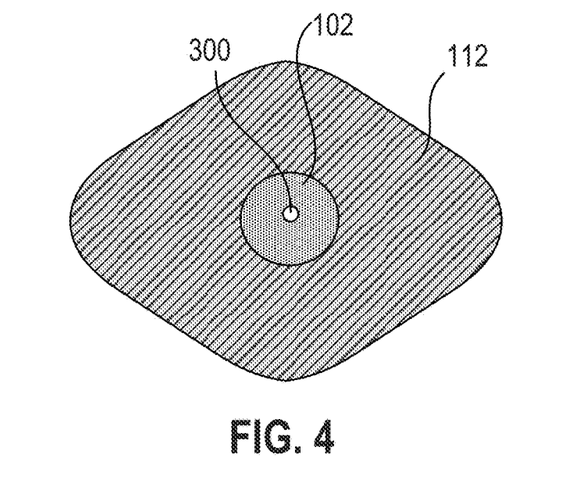
FIG. 4 illustrates a close up cross-sectional view of the blade portion of the exemplary polyurethane sword of FIG. 1, according to one or more embodiments.

Reference is now made to FIG. 4, which illustrates a close up cross-sectional view of the blade portion 108 of the polyurethane sword 100, according to one or more embodiments. In one preferred embodiment, the flexible support member 102 is positioned in a substantially center position of the polyurethane sword 100's sword blade. In this and other embodiments, the polyurethane sword 100's sword blade is composed primarily of the polyurethane outer layer 112 and the flexible support member 102. As can be seen from FIG. 4, the cross-section of the flexible support member 102 may be shaped as an annulus having a small hollow core. In this embodiment, the flexible support member 102 is shaped as an open cylinder. Moreover, the thickness of the flexible support member 102's cylinder wall surrounding its hollow core may range from 2.0 mm to 3.0 mm. In other embodiments, the thickness of the flexible support member 102's cylinder wall surrounding its hollow core ranges from 3.0 mm to 4.0 mm. In additional embodiments, the thickness of the flexible support member 102's cylinder wall surrounding its hollow core ranges from 4.0 mm to 5.0 mm. In these and other embodiments, the thickness of the flexible support member 102's cylinder wall surrounding its hollow core may be sized in proportion to the length of the flexible support member 102. In these cases, the greater the length of the flexible support member 102, the thicker the flexible support member 102's cylinder wall surrounding its hollow core.

Figure 5:
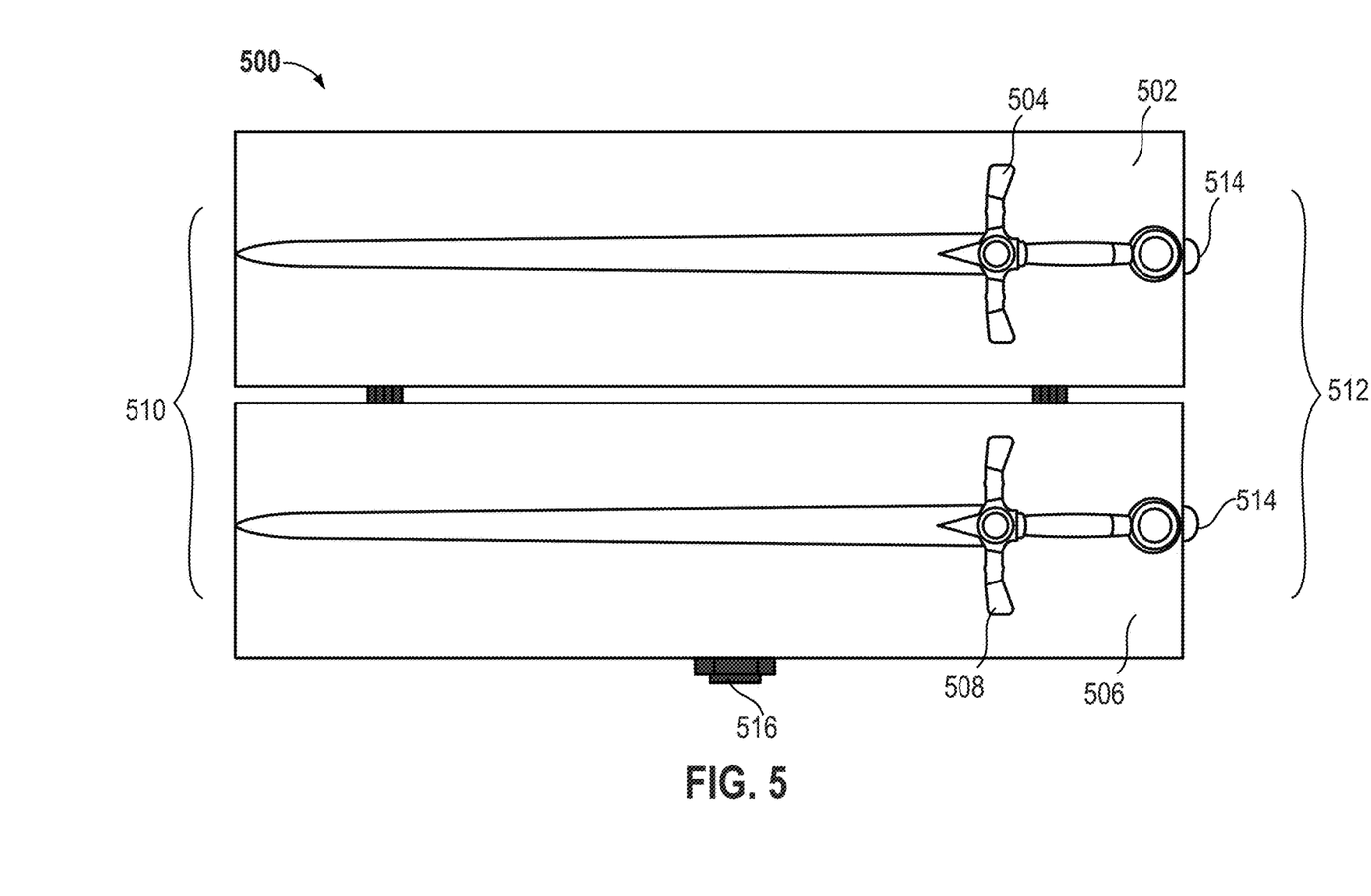
FIG. 5 is a schematic of an exemplary sword mold, according to one or more embodiments.

Reference is now made to FIG. 5, which is a schematic of an exemplary sword mold 500. As can be seen in FIG. 5, the sword mold 500 may comprise a first half 502 and a second half 506. In some embodiments, one or more hinges may connect the first half 502 of the sword mold 500 to the second half 506. Both the first half 502 and the second half 506 of the sword mold 500 may be substantially shaped as a rectangle. In one embodiment, the length of the rectangle may be equivalent to the length of the polyurethane sword 100 from the handle to the blade tip. As shown in FIG. 5, the first half 502 of the sword mold 500 may comprise a first mold form 504 and the second half 506 of the sword mold 500 may comprise a second mold form 508. In one embodiment, the first mold form 504 may be identical to the second mold form 508. In other embodiments, the first mold form 504 may be different from the second mold form 508 depending on the surface ornamentation of the polyurethane sword 100.

In addition, the sword mold 500 may comprise a handle end 512 and a blade end 510. As seen in FIG. 5, one or more handlebars 514 may be coupled to the handle end 512 of the sword mold 500. In an embodiment not shown in FIG. 5, the one or more handlebars 514 may be coupled to the blade end 512 of the sword mold 500. In addition, a latch mechanism 516 may be coupled to the first half 502 and/or the second half 506 of the sword mold 500 to secure the first half 502 of the sword mold 500 to the second half 506. In this embodiment, the sword mold 500 operates similar to a suitcase where the first mold form 504 and the second mold form 508 act as the interior of the suitcase.

In some embodiments, the first mold form 504 and the second mold form 508 may be configured to extend to the edges of the sword mold 500 at both the handle end 512 and the blade end 510. By doing so, the sword mold 500 leaves an aperture or opening at the blade end 510 of the sword mold and an aperture or opening at the handle end 512 of the sword mold 500. Such an arrangement also ensures that the first aperture 104 and the second aperture 106 of the flexible support member 102 are exposed when the flexible support member 102 is placed in the center of either the first mold form 504 or the second mold form 508.

In some embodiments, the sword mold 500 may be composed of a metallic material (e.g., steel). In other embodiments, the sword mold 500 may be composed of a ceramic material. In all such embodiments, the material used to create the sword mold 500 must be capable of withstanding heat of at least 45 degrees Celsius.

Figure 6:
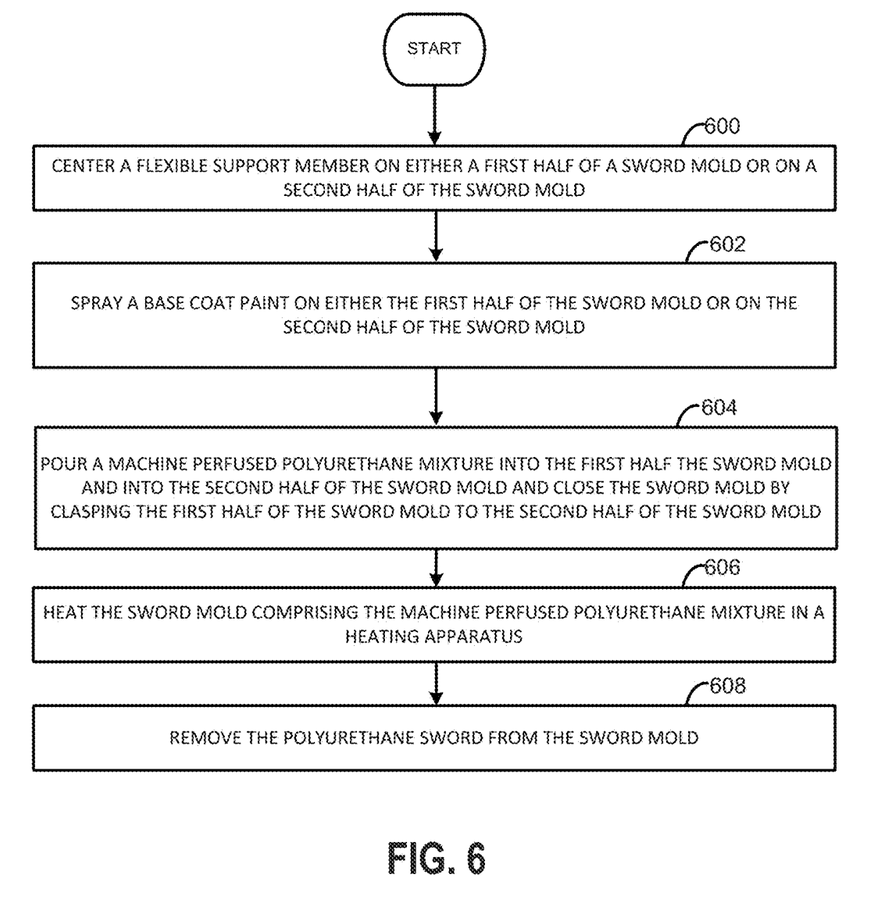
FIG. 6 is a process flow diagram illustrating an exemplary method to manufacture a polyurethane sword, according to one or more embodiments.

Reference is now made to FIG. 6, which is a process flow diagram illustrating an exemplary method to manufacture a polyurethane sword. In one embodiment, the exemplary method may be used to manufacture the polyurethane sword 100 of FIG. 1. In this embodiment, step 600 involves centering the flexible support member 102 on either the first half 502 (in the first mold form 504) or on the second half 506 (in the second mold form 508) of the sword mold 500. In one embodiment, the length of the flexible support member 102 may be greater than the length of the sword mold 500 and one or both ends of the flexible support member 102 may protrude from the apertures at the blade end 510 and the handle end 512 of the sword mold 500. In this embodiment, the ends of the flexible support member 102 that protrude from the apertures may later be cut so that the length of the flexible support member 102 may be substantially equal to the length of the polyurethane sword 100 once the polyurethane sword 100 has been removed from the sword mold 500. In other embodiments, the length of the flexible support member 102 may be substantially equal to the length of the sword mold 500.

Additionally, step 602 may involve spraying a base coat paint on the first half 502 (on the first mold form 504) and/or the second half 506 (on the second mold form 508) of the sword mold 500. In one embodiment, the base coat paint may be an acrylic paint. Step 604 may involve pouring, injecting, and/or extruding a machine perfused polyurethane mixture (for example, the machine perfused polyurethane mixture discussed in the preceding sections) into the first half 502 (in the first mold form 504) and the second half 506 (in the second mold form 508) of the sword mold 500. In one embodiment, the machine perfused polyurethane mixture may be injected, poured, and/or extruded into the sword mold 500 by a pneumatic polyurethane mixing apparatus at high pressure. In addition, the step involves closing the sword mold 500 by latching or clasping the first half 502 of the sword mold 500 to the second half 506 of the sword mold 500. In one embodiment, the first half 502 of the sword mold 500 may be latched or clasped to the second half 506 of the sword mold using the latch mechanism 516. Moreover, step 606 involves heating the sword mold 500 comprising the machine perfused polyurethane mixture in a heating apparatus. In one embodiment, the heating apparatus may be a curing oven. In another embodiment, the heating apparatus may be a baking oven. In yet another embodiment, the heating apparatus may be a batch oven.

In these and other embodiments, the step of heating the sword mold 500 may involve heating the sword mold 500 at a heating temperature of between 45 to 55 degrees Celsius for 10 to 15 minutes. In an alternative embodiment, the heating step may be performed at a heating temperature of between 40 to 45 degrees for 15 to 20 minutes. In yet another embodiment, the heating step may be performed at a heating temperature of between 55 to 65 degrees Celsius for 5 to 10 minutes. Once the heated sword mold 500 has been removed from the heating apparatus and the sword mold 500 has been allowed to rest at room temperature, the sword mold 500 can be opened and the polyurethane sword can be removed from the sword mold 500 in step 608.

Figure 7:
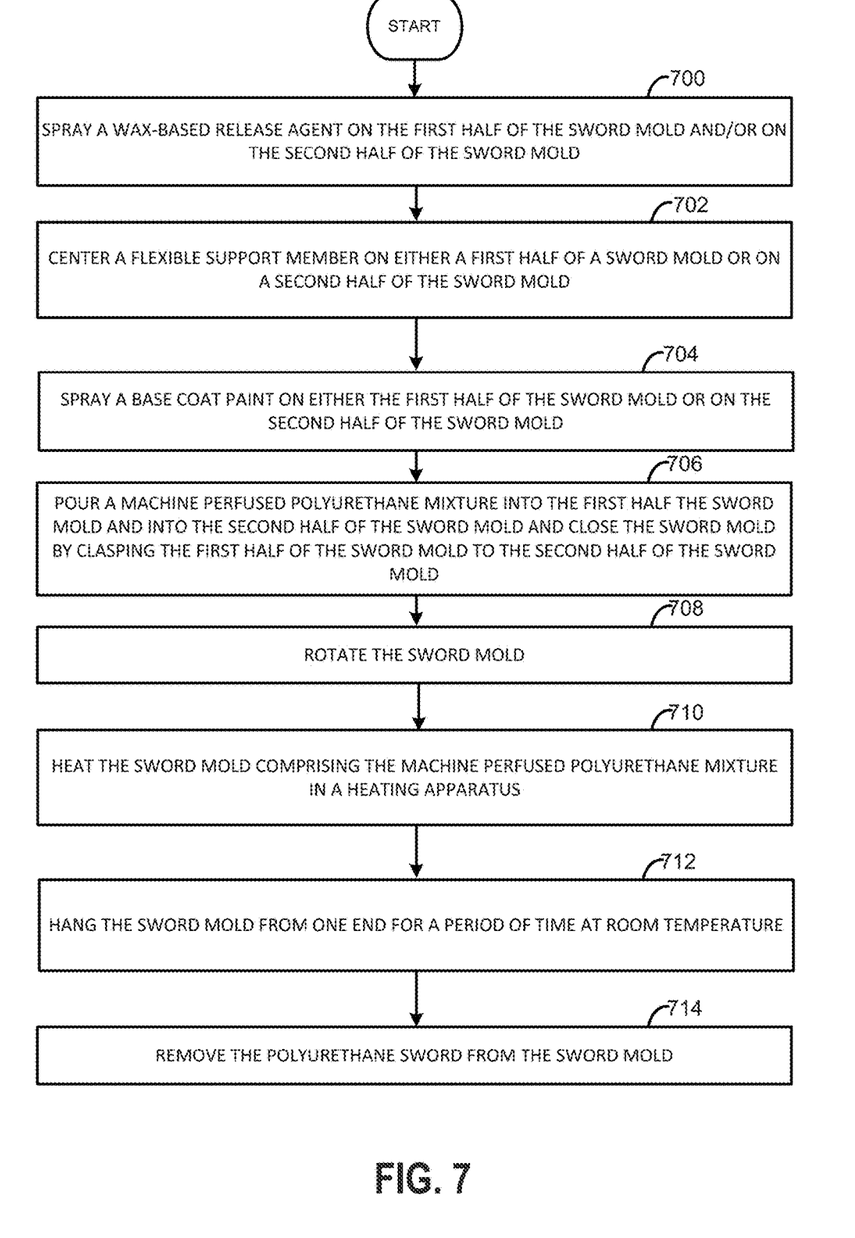
FIG. 7 is a process flow diagram illustrating an exemplary method to manufacture a polyurethane sword, according to one or more embodiments.

Reference is now made to FIG. 7, which is a process flow diagram illustrating another exemplary method to manufacture a polyurethane sword. In one embodiment, the method may be used to manufacture the polyurethane sword 100 of FIG. 1. In this embodiment, step 700 involves spraying a wax-based release agent on the first half 502 (on the first mold form 504) and/or the second half 506 (on the second mold form 508) of the sword mold 500. The wax-based release agent may aid in the removal of the polyurethane sword from the sword mold 500 after the mold has been heated. Step 702 involves centering the flexible support member 102 in either the first half 502 (in the first mold form 504) or in the second half 506 (in the second mold form 508) of the sword mold 500.

As discussed previously, the length of the flexible support member 102 may initially be greater than the length of the sword mold 500 and one or both ends of the flexible support member 102 may protrude from the apertures at the blade end 510 and the handle end 512 of the sword mold 500. In this embodiment, the ends of the flexible support member 102 that protrude from the apertures may later be cut so that the length of the flexible support member 102 is substantially equal to the length of the polyurethane sword 100 once the polyurethane sword 100 has been removed from the sword mold 500. In other embodiments, the length of the flexible support member 102 may initially be substantially equal to the length of the sword mold 500.

Additionally, step 704 may involve spraying a base coat paint on the first half 502 (on the first mold form 504) and/or the second half 506 (on the second mold form 508) of the sword mold 500. In one embodiment, the base coat paint may be an acrylic paint. Step 706 may involve pouring, injecting, and/or extruding a machine perfused polyurethane mixture (for example, the machine perfused polyurethane mixture discussed in the preceding sections) into the first half 502 (in the first mold form 504) and the second half 506 (in the second mold form 508) of the sword mold 500. In one embodiment, the machine perfused polyurethane mixture may be injected, poured, and/or extruded into the sword mold 500 by a pneumatic polyurethane mixing apparatus at high pressure. In addition, the step involves closing the sword mold 500 by latching or clasping the first half 502 of the sword mold 500 to the second half 506 of the sword mold 500. In one embodiment, the first half 502 of the sword mold 500 may be latched or clasped to the second half 506 of the sword mold using the latch mechanism 516.

Step 708 involves rotating the closed sword mold 500 around its longitudinal center of axis. This rotation step may be needed so that the machine perfused polyurethane mixture permeates the entirety of the interior of the sword mold 500. In addition, step 710 involves heating the sword mold 500 comprising the machine perfused polyurethane mixture in a heating apparatus. In one embodiment, the heating apparatus may be a curing oven. In another embodiment, the heating apparatus may be a baking oven. In yet another embodiment, the heating apparatus may be a batch oven.

In these and other embodiments, the step of heating the sword mold 500 may involve heating the sword mold 500 at a heating temperature of between 45 to 55 degrees Celsius for 10 to 15 minutes. In an alternative embodiment, the heating step may be performed at a heating temperature of between 40 to 45 degrees for 15 to 20 minutes. In yet another embodiment, the heating step may be performed at a heating temperature of between 55 to 65 degrees Celsius for 5 to 10 minutes.

Once the heated sword mold 500 has been removed from the heating apparatus, step 712 involves hanging the sword mold 500 by its one or more handlebars 514 for a period of time at room temperature. In one embodiment, the sword mold 500 may be hung from its handle end 512 using the one or more handlebars 514. In another embodiment, the sword mold 500 may be hung from its blade end 510 using the one or more handlebars 514. In some embodiments, the sword mold 500 may be hung at room temperature for a period of 45 to 60 minutes. In other embodiments, the sword mold 500 may be hung at room temperature in excess of 60 minutes. Once the sword mold 500 has been hung at room temperature for a period of time, the sword mold 500 can be opened and the polyurethane sword 100 can be removed from the sword mold 500 in step 714. Furthermore, the method may also comprise the step of deburring the polyurethane sword 100 after removing it from the sword mold 500. In some embodiments, the deburring step can be performed by a deburring machine. In other embodiments, the deburring step can be performed manually using a deburring tool.

Figure 8A:
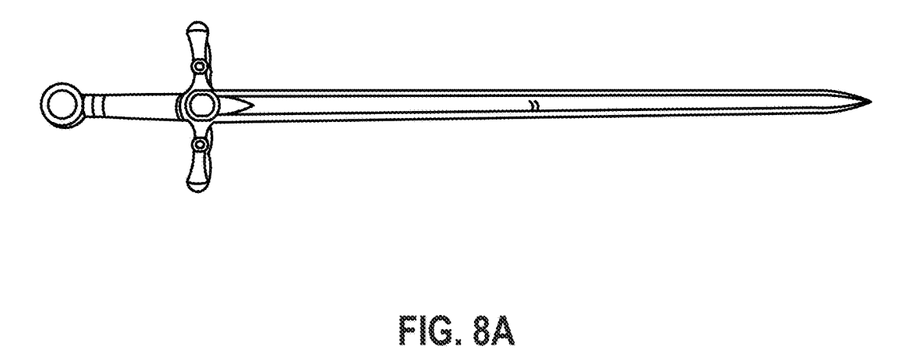
FIGS. 8A and 8B are black-and-white line drawings of exemplary polyurethane swords, according to one or more embodiments.
Figure 8B:
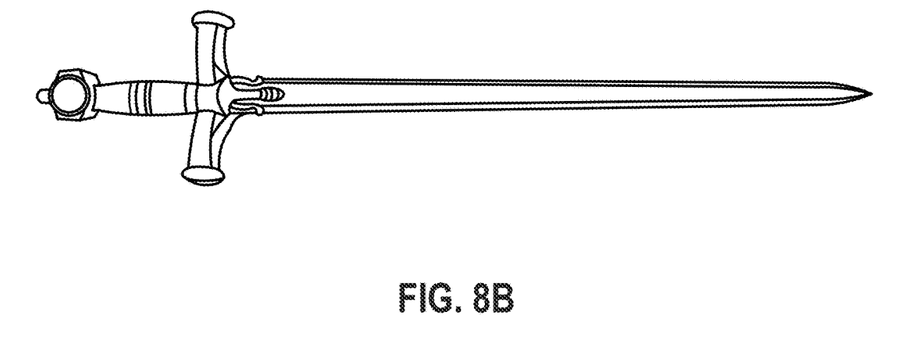

Reference is now made to FIGS. 8A and 8B, which are black-and-white line drawings of exemplary polyurethane swords manufactured using the aforementioned methods. As can be seen in FIGS. 8A and 8B, the visual appearance of the polyurethane swords exhibit a likeness to metallic swords unlike traditional toy-type swords. The handle portion of the polyurethane sword may be decorated further with additional coats of paint and surface ornamentation. In the example embodiment shown in FIGS. 8A and 8B, the handles of the polyurethane swords may be meticulously painted to mimic swords of a certain era or geographic region.

Figure 9A:
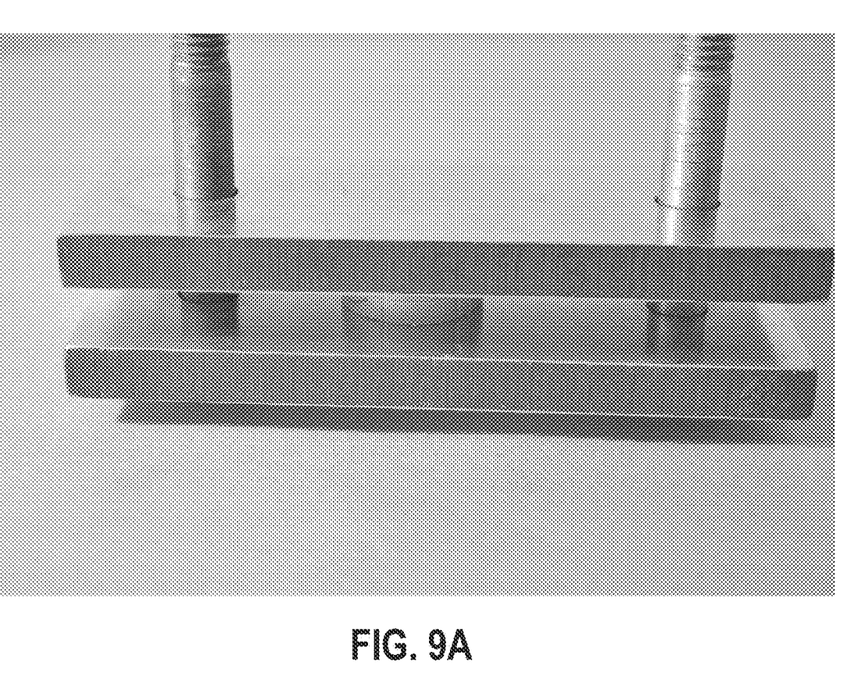
FIG. 9A is a black-and-white image of a compression set test being performed on a portion of the polyurethane outer layer of an exemplary polyurethane sword, according to one or more embodiments.

Reference is now made to FIG. 9A, which is a black-and-white image of a compression set test being performed on a portion of the polyurethane outer layer 112 of an exemplary polyurethane sword (for example, the polyurethane sword 100) manufactured according to the methods described in the preceding sections. In the field of polymers, compression set testing is used to determine a polymer material's ability to retain elastic properties after prolonged compressive stresses. A series of compression set tests were performed in accordance with American Society for Testing and Materials (ASTM) D395-03 (2008), Standard Test Methods for Rubber Property—Compression Set, Method B. A flat section of the polyurethane outer layer 112 of the polyurethane sword 100 was used as the sample material. The sample height was measured with a Mitutoyo® 6 inch digital caliper. The sample was then compressed to 25% of its original thickness (also referred to as: 75% compressive deformation) for a period of 24 hours at 23 degrees Celsius and 50% relative humidity (as measured by an Omega® Hygrometer). After 24 hours, the sample was then removed and allowed to rebound for 30 minutes. The final thickness of the sample was measured and the compression set calculated. The test was then repeated on additional polyurethane swords manufactured according to the methods described in the preceding sections. The results of such tests revealed that the polyurethane outer layer 112 of such swords exhibited a compression set of between 2.9% to 5.8% when measured at a 75% compressive deformation level. For example, in one such test, the initial thickness of the polyurethane outer layer 112 sample was approximately 0.445 inches. After being compressed to approximately 0.342 inches for 24 hours, the sample rebounded to 0.440 inches after 30 minutes, exhibiting a compression set of 4.85%.

Figure 9B:
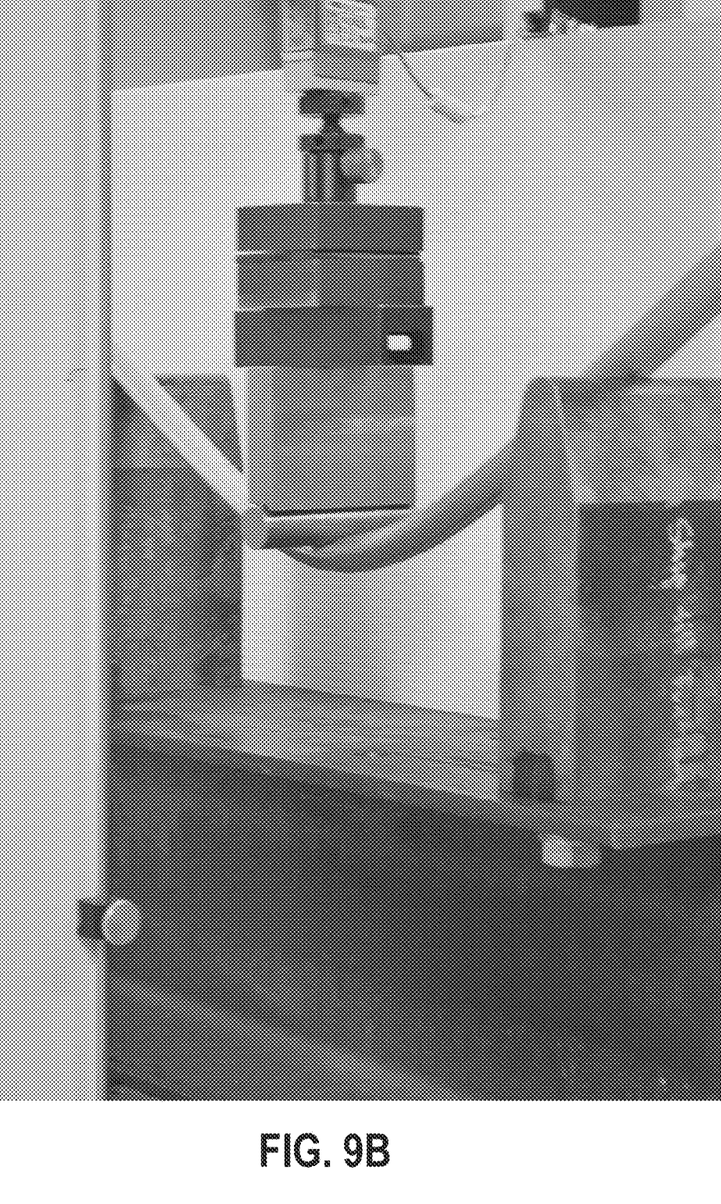
FIG. 9B is a black-and-white image of a flexural test being performed on an exemplary polyurethane sword.

Reference is now made to FIG. 9B, which is a black-and-white image of a flexural test being performed on a portion of the blade portion 108 of an exemplary polyurethane sword (for example, the polyurethane sword 100) manufactured according to the methods described in the preceding sections. The flexural properties of the polyurethane sword was determined in accordance with ASTM D790-10, Standard Test Methods of Unreinforced and Reinforced Plastics and Insulating Materials. A Tinius Olsen® H50K-S Universal Load Tester was utilized to test the entire sword (including both the blade portion 108 and the handle portion 110) using a 3-point loading orientation. An 18 inch span was chosen in order to accommodate a significant portion of the blade portion 108. The flexural load (a Tinius Olsen® 1,000 lb Load Cell) was applied at the midpoint of the blade portion 108 at a rate of 2 inches/minute. Multiple polyurethane swords were tested and the load and deflection distances were recorded at the time of failure. All tests were performed at 23 degrees Celsius and 50% relative humidity was measured by an Omega® Hygrometer. The results of such tests revealed that the polyurethane sword is configured to withstand a maximum flexural load of between 300 Newtons to 360 Newtons of force with an average maximum deflection distance of approximately 12 cm.

Figure 9C:
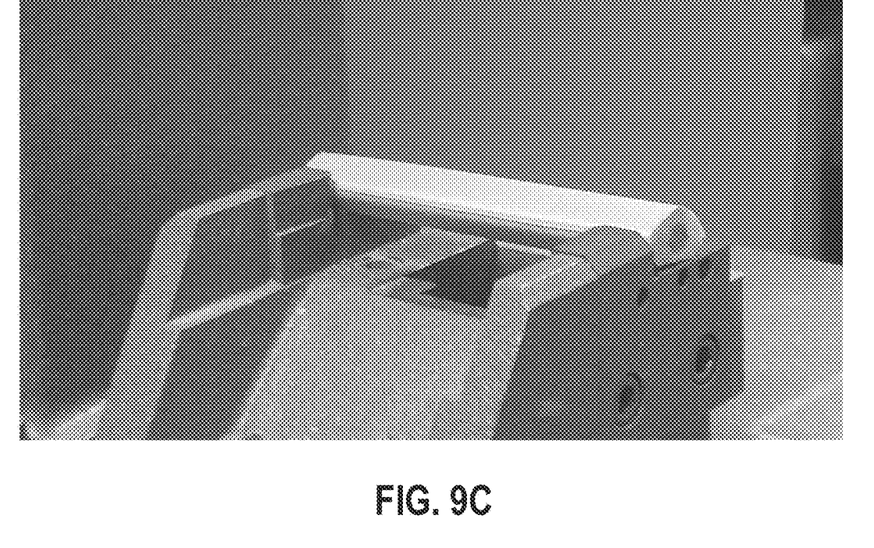
FIG. 9C is a black-and-white image of an impact test being performed on the blade portion of an exemplary polyurethane sword.

Reference is now made to FIG. 9C, which is a black-and-white image of an impact test being performed on a portion of the blade portion 108 of an exemplary polyurethane sword (for example, the polyurethane sword 100) manufactured according to the methods described in the preceding sections. A series of impact tests were performed in accordance with ASTM D6110-10, Standard Test Methods for Determining the Charpy Impact Resistance of Notched Specimens of Plastics. A 5 inch sample segment (including both the polyurethane outer layer 112 and the flexible support member 102) was cut from the blade portion 108 of the polyurethane sword and tested using a Tinius Olsen® Charpy Impact Tester utilizing a 4 inch span. Tests were performed on multiple polyurethane swords and the impact energies and failure modes of such swords were recorded.

Figure 9D:
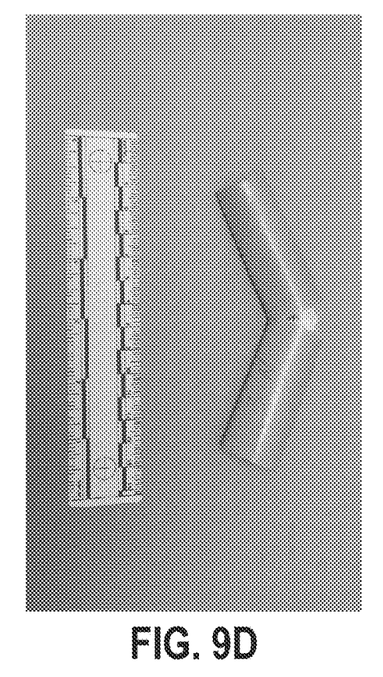
FIG. 9D is a black-and-white image of a transverse failure of a part of the blade portion of the exemplary polyurethane sword as a result of the impact test shown in FIG. 9C.
Figure 9E:
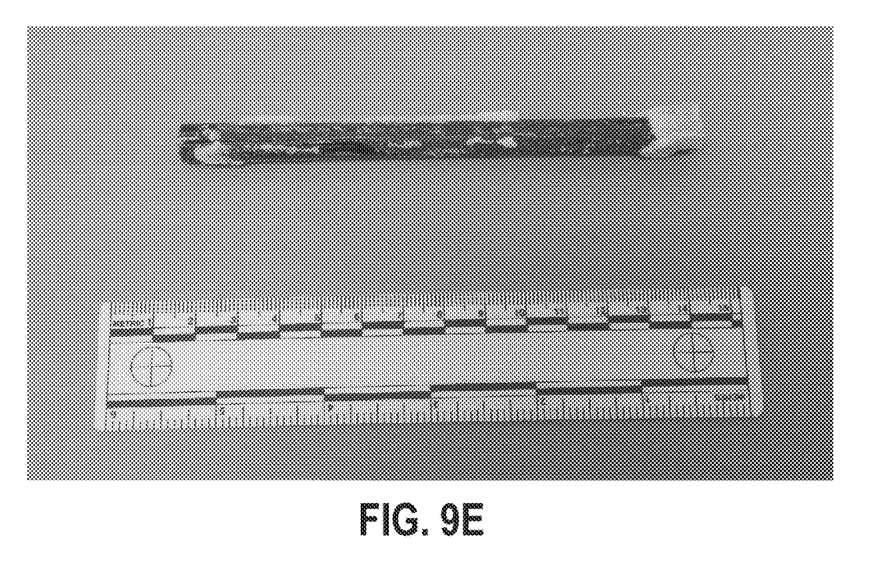
FIG. 9E is a black-and-white image of a longitudinal failure of a part of the blade portion of the exemplary polyurethane sword as a result of the impact test shown in FIG. 9C.

As can be seen in FIGS. 9D and 9E, failures occurred as either longitudinal failures of the flexible support member 102 or transverse failures of the polyurethane outer layer 112 and/or the flexible support member 102. FIG. 9D is a black-and-white image depicting a transverse failure of the 5 inch sample segment as a result of the impact test. FIG. 9E is a black-and-white image depicting a longitudinal failure of a segment of the flexible support member 102 as a result of the impact test. The results of such tests revealed that the blade portion 108 of the polyurethane sword is configured to withstand an impact of between 19.6 Joules to 22.5 Joules of energy before the blade portion 108 experiences either a transverse failure or a longitudinal failure. These test results reveal that the polyurethane swords manufactured using the methods disclosed herein comprises certain key mechanical properties superior to those exhibited by other toy-type swords.

Also disclosed is a sparring instrument (a club, a bat, a staff, etc.) comprising a support member (similar to the flexible support member 102) having a handle portion and a distal portion. In addition, the sparring instrument's support member may also comprise a handle support portion and a distal support portion. In one or more embodiments, the sparring instrument may share all of the attributes of the polyurethane sword 100 of FIG. 1 except the distal portion of the sparring instrument is not shaped as a blade. In this embodiment, a polyurethane outer layer (similar to the polyurethane outer layer 112) may be configured to encase the support member from the handle support portion to the distal support portion. In this and other embodiments, the handle portion of the sparring instrument comprises the handle support portion and the polyurethane outer layer encasing the handle support portion. Moreover, the distal portion of the sparring instruments comprises the distal support portion and the polyurethane outer layer encasing the distal support portion. Similar to the polyurethane sword 100, the polyurethane outer layer encasing the support member may be composed of a machine perfused polyurethane mixture. In one or more embodiments, the machine perfused polyurethane mixture comprises 67% polyurethane polymers and 33% MDI.

In these and other embodiments, the support member may comprise a substantially cylindrical hollow core extending from the handle support portion to the distal support portion. Moreover, the polyurethane outer layer may expose a first aperture of the substantially cylindrical hollow core at a first end (similar to the first end 104) of the support member and a second aperture of the substantially cylindrical hollow core at a second end (similar to the second end 106) of the support member. Moreover, the support member may be composed of a polyester resin and fiberglass.

A number of embodiments have been described. Nevertheless, it will be understood that various modifications may be made without departing from the spirit and scope of the claimed embodiments. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

I claim:

1. A method of making a polymeric sword, comprising the steps of:
    centering a flexible support member on either a first half of a sword mold or on a second half of the sword mold;
    pouring a polymer mixture into the first half the sword mold and into the second half of the sword mold and closing the sword mold by clasping the first half of the sword mold to the second half of the sword mold;
    heating the sword mold comprising the polymer mixture in a heating apparatus; and
    removing the polymeric sword from the sword mold.

2. The method of claim 1, further comprising the step of spraying a wax-based release agent on the first half of the sword mold and on the second half of the sword mold before centering the flexible support member.

3. The method of claim 1, further comprising the step of rotating the sword mold before heating the sword mold.

4. The method of claim 1, further comprising the step of hanging the sword mold from one end for a period of time at room temperature after heating the sword mold.

5. The method of claim 1, wherein the polymer mixture is a polymer polyol mixture.

6. The method of claim 5, wherein the polymer polyol mixture is a machine perfused polyurethane mixture.

7. The method of claim 1, wherein the step of heating the sword mold comprises heating the sword mold between 45-55 degrees Celsius for 10-15 minutes.

8. The method of claim 1, wherein the flexible support member comprises a substantially cylindrical hollow core extending from a handle support portion of the polymeric sword to a blade support portion of the polymeric sword.

9. The method of claim 8, further comprising the step of exposing a first aperture of the substantially cylindrical hollow core at a first end of the flexible support member and exposing a second aperture of the substantially cylindrical hollow core at a second end of the flexible support member.

10. The method of claim 1, further comprising rotating the closed sword mold around its longitudinal center of axis.

11. A method of making a sparring instrument, comprising the steps of:
    centering a flexible support member on either a first half of a sparring instrument mold or on a second half of the sparring instrument mold;
    pouring a polymer mixture into the first half the sparring instrument mold and into the second half of the sparring instrument mold and closing the sparring instrument mold by clasping the first half of the sparring instrument mold to the second half of the sparring instrument mold;
    heating the sparring instrument mold comprising the polymer mixture in a heating apparatus; and
    removing the sparring instrument from the sparring instrument mold.

12. The method of claim 1, further comprising the step of spraying a wax-based release agent on the first half of the sparring instrument mold and on the second half of the sparring instrument mold before centering the flexible support member.

13. The method of claim 11, further comprising the step of rotating the sparring instrument mold before heating the sparring instrument mold.

14. The method of claim 11, further comprising the step of hanging the sparring instrument mold from one end for a period of time at room temperature after heating the sparring instrument mold.

15. The method of claim 11, wherein the polymer mixture is a polymer polyol mixture.

16. The method of claim 15, wherein the polymer polyol mixture is a machine perfused polyurethane mixture.

17. The method of claim 11, wherein the step of heating the sparring instrument mold comprises heating the sparring instrument mold between 45-55 degrees Celsius for 10-15 minutes.

18. The method of claim 11, wherein the flexible support member comprises a substantially cylindrical hollow core extending from a handle support portion of the sparring instrument to a distal portion of the sparring instrument.

19. The method of claim 18, further comprising the step of exposing a first aperture of the substantially cylindrical hollow core at a first end of the flexible support member and exposing a second aperture of the substantially cylindrical hollow core at a second end of the flexible support member.

20. The method of claim 11, further comprising rotating the closed sparring instrument mold around its longitudinal center of axis.

* * * * *